(12) United States Patent
Ye et al.

(10) Patent No.: US 8,845,164 B2
(45) Date of Patent: Sep. 30, 2014

(54) ILLUMINATION DEVICE

(71) Applicants:Wintek (China) Technology Ltd., Dongguan (CN); Wintek Corporation, Taichung (TW)

(72) Inventors: Zhi-Ting Ye, Miaoli County (TW); Chin-Liang Chen, Taichung (TW); Ming-Chuan Lin, Taichung (TW); Ting-Li Lin, Changhua County (TW); Fang-I Chang, Taichung (TW); Kuan-Pao Lu, New Taipei (TW); Hsiu-Ping Lee, Taichung (TW)

(73) Assignees: Wintek (China) Technology Ltd., Songshan Lake National High-tech Industrial Development Zone, Dongguan, Guangdong Province (CN); Wintek Corporation, Tanzi Dist., Taichung (TW)

( * ) Notice: Subject to any disclaimer, the term of this patent is extended or adjusted under 35 U.S.C. 154(b) by 91 days.

(21) Appl. No.: 13/848,030

(22) Filed: Mar. 20, 2013

(65) Prior Publication Data

US 2013/0250605 A1 Sep. 26, 2013

(30) Foreign Application Priority Data

Mar. 20, 2012 (TW) .............................. 101204981 U

(51) Int. Cl.
*F21V 7/04* (2006.01)
*F21V 8/00* (2006.01)

(52) U.S. Cl.
CPC ................................... *G02B 6/0005* (2013.01)
USPC .......................................... 362/555; 362/551

(58) Field of Classification Search
USPC .................................................... 362/551–555
See application file for complete search history.

(56) References Cited

U.S. PATENT DOCUMENTS

2003/0006230 A1* 1/2003 Kaji et al. ..................... 219/620
2013/0208498 A1* 8/2013 Ouderkirk ..................... 362/555

* cited by examiner

*Primary Examiner* — Mary Ellen Bowman
(74) *Attorney, Agent, or Firm* — Winston Hsu; Scott Margo

(57) ABSTRACT

An illumination device includes a light guiding core, an optical film and a light emitting module. The optical film separately surrounds the light guiding core. A ratio of a diameter of the optical film to a diameter of the light guiding core is between 2 and 3. The light emitting module is disposed at one side of the light guiding core.

9 Claims, 5 Drawing Sheets

ILLUMINATION DEVICE

BACKGROUND OF THE INVENTION

1. Field of the Invention

The invention relates to an illumination device and, more particularly, to an illumination device with an optical film separately surrounding a light guiding core.

2. Description of the Prior Art

So far illumination device is considered a necessity by a lot of people. With the popularization of the illumination device, monotonous illumination function cannot satisfy the demands of consumers anymore. Therefore, more and more illumination devices with illumination function and pleasing appearance have been developed. Referring to FIG. 1, FIG. 1 is a schematic diagram illustrating an illumination device 1 of the prior art. As shown in FIG. 1, the illumination device 1 comprises a light guiding core 10, a light emitting module 12 and a base 14. The light guiding core 10 is disposed on the base 14. The light emitting module 12 is disposed in the base 14 and located at one side of the light guiding core 10. Light emitted by the light emitting module 12 can be projected out of a periphery of the light guiding core 10. A light emitting area of the illumination device 1 is determined by a diameter D of the light guiding core 10. Accordingly, in order to increase the light emitting area of the illumination device 1, the diameter D of the light guiding core 10 has to be increased. However, since an increasing rate of production cost of the illumination device 1 is much larger than an increasing rate of the diameter D of the light guiding core 10, to increase the diameter D of the light guiding core 10 does not satisfy the need of production cost. Furthermore, since the light guiding core 10 is usually made of plastic, the exposed light guiding core 10 will be scraped easily and this will influence the visual effect.

SUMMARY OF THE INVENTION

Therefore, an objective of the invention is to provide an illumination device with an optical film separately surrounding a light guiding core, so as to solve the aforesaid problems.

According to an embodiment of the invention, an illumination device comprises a light guiding core, an optical film and a light emitting module. The optical film separately surrounds the light guiding core and a ratio of a diameter of the optical film to a diameter of the light guiding core is between 2 and 3. The light emitting module is disposed at one side of the light guiding core.

As mentioned in the above, the optical film of the invention separately surrounds the light guiding core such that light projected out of the light guiding core is reflected by the optical film so as to form illusional and enlarged illumination effect. Furthermore, the optical film, which separately surrounds the light guiding core, can prevent the light guiding core from being scraped. When the ratio of the diameter of the optical film to the diameter of the light guiding core is between 2 and 3, the illumination device of the invention can obtain optimal imaging effect by experiment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
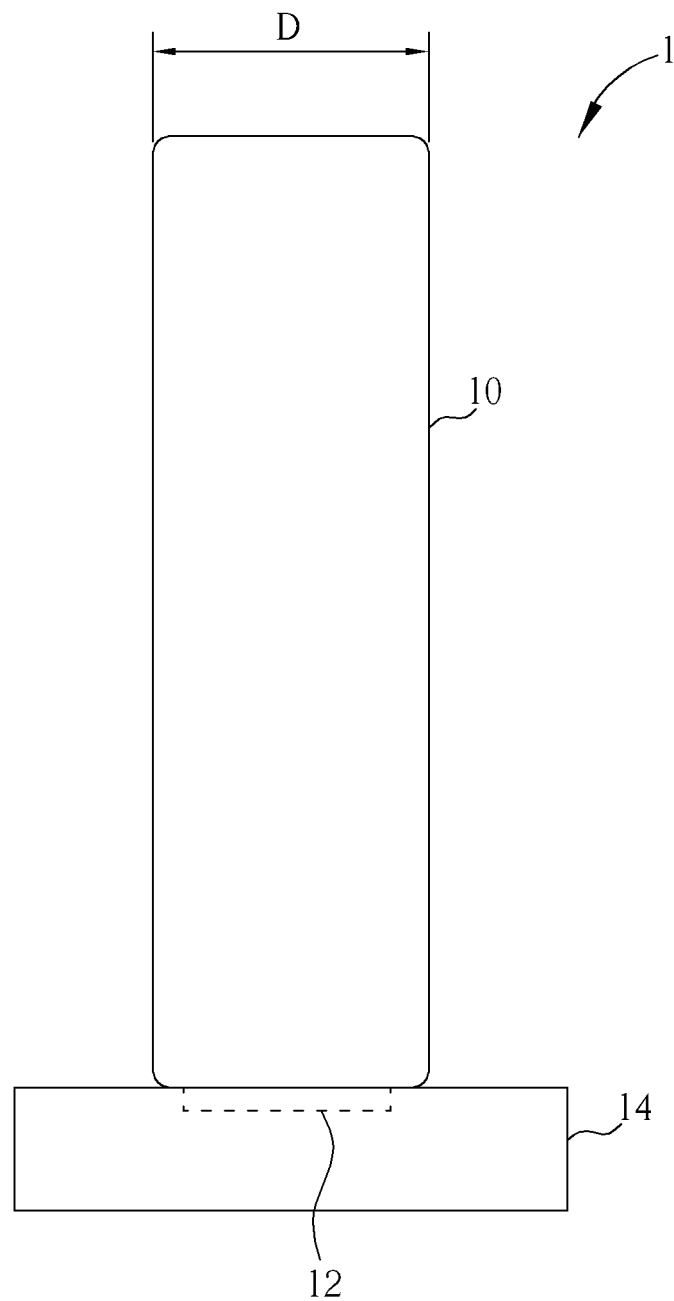
FIG. 1 is a schematic diagram illustrating an illumination device of the prior art.
Figure 2:
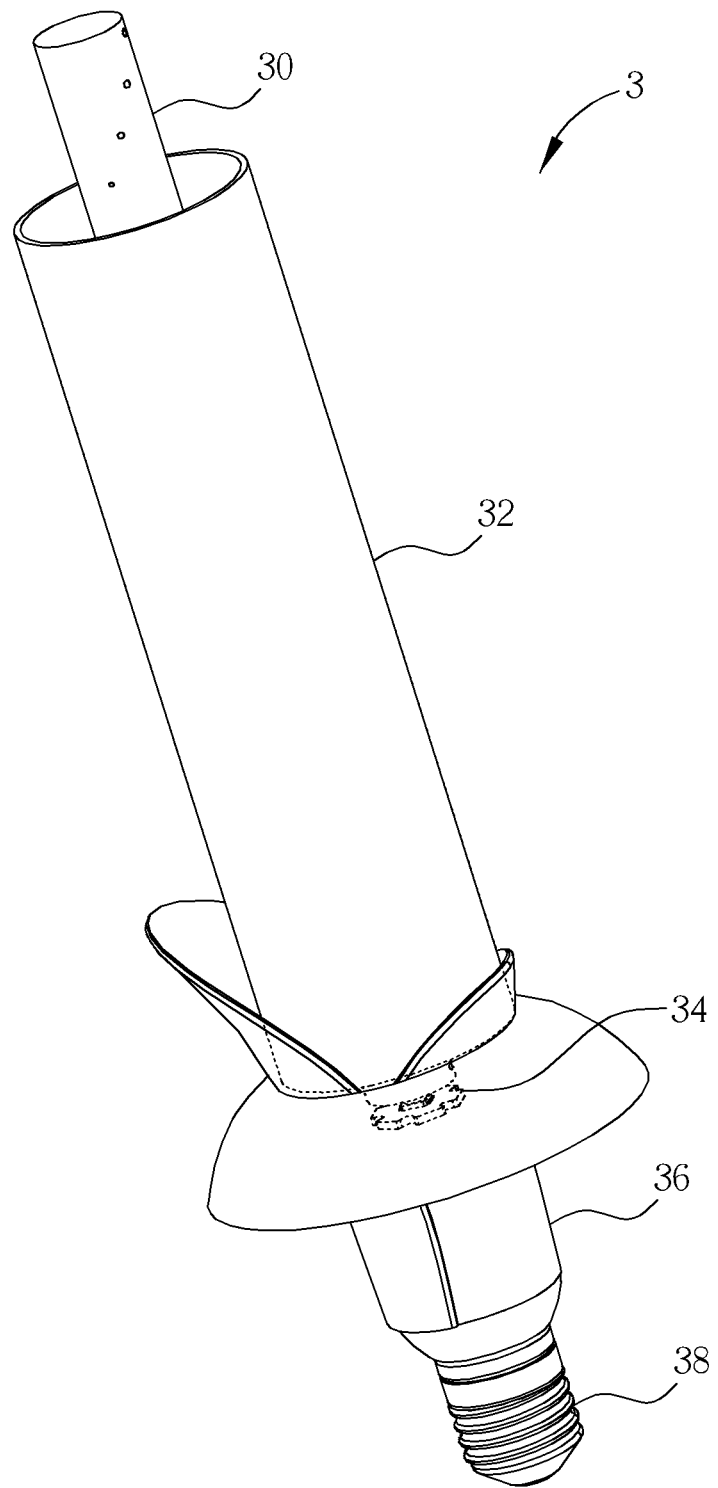
FIG. 2 is a perspective view illustrating an illumination device according to an embodiment of the invention.
Figure 3:
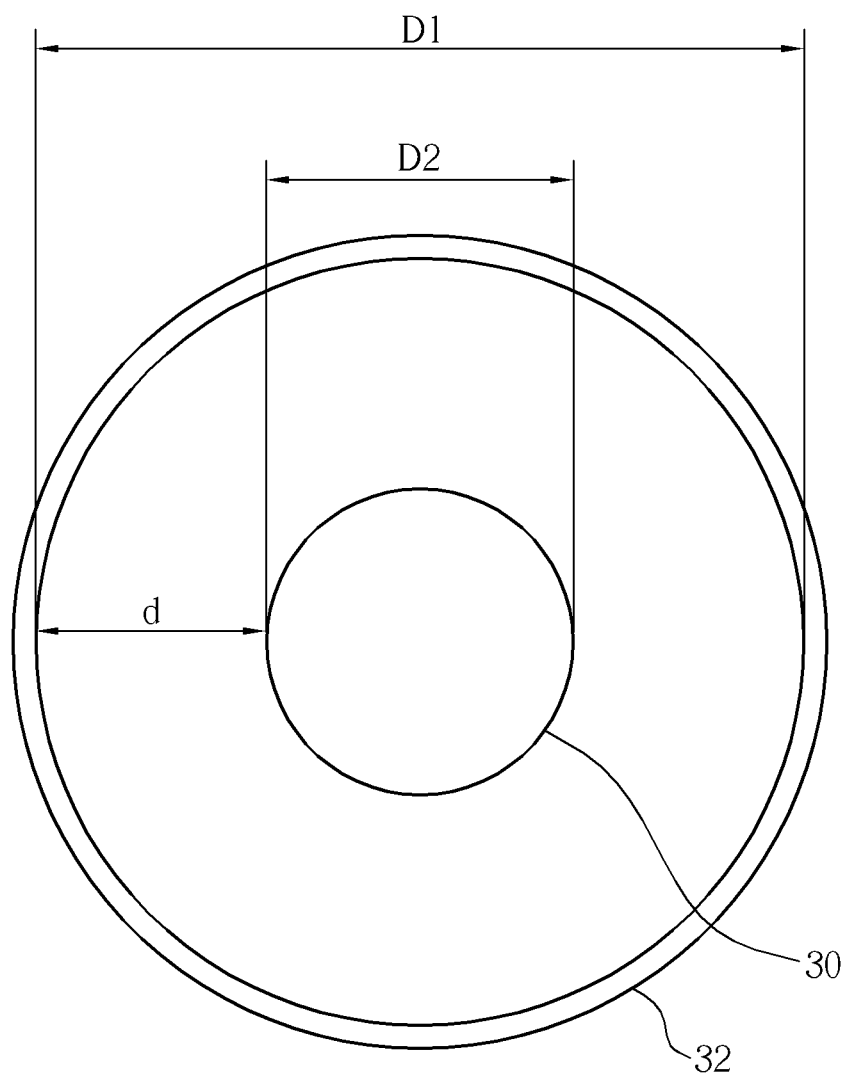
FIG. 3 is a top view illustrating the light guiding core and the optical film shown in FIG. 2.
Figure 4:
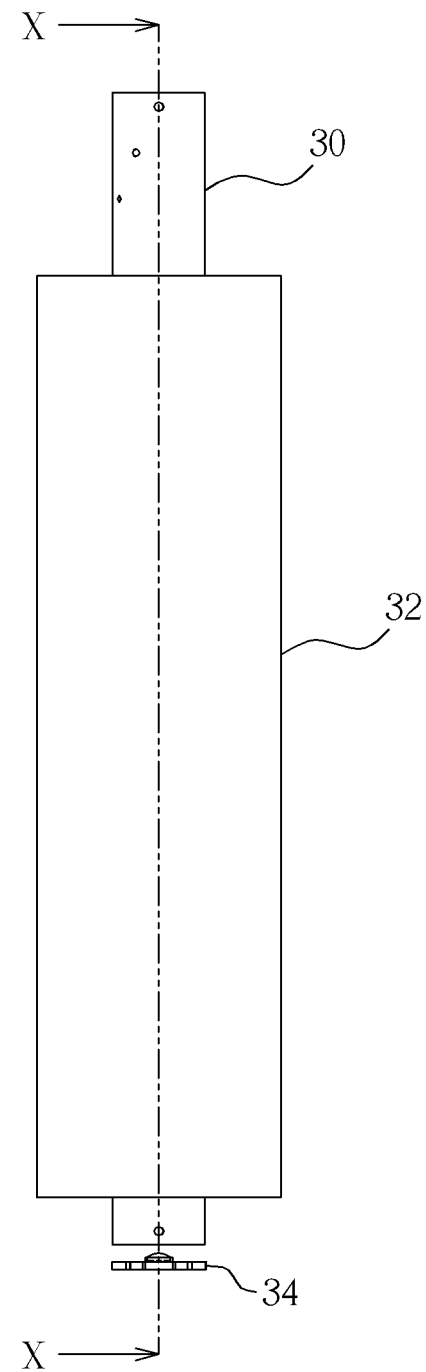
FIG. 4 is a side view illustrating the light guiding core, the optical film and the light emitting module shown in FIG. 2.
Figure 5:
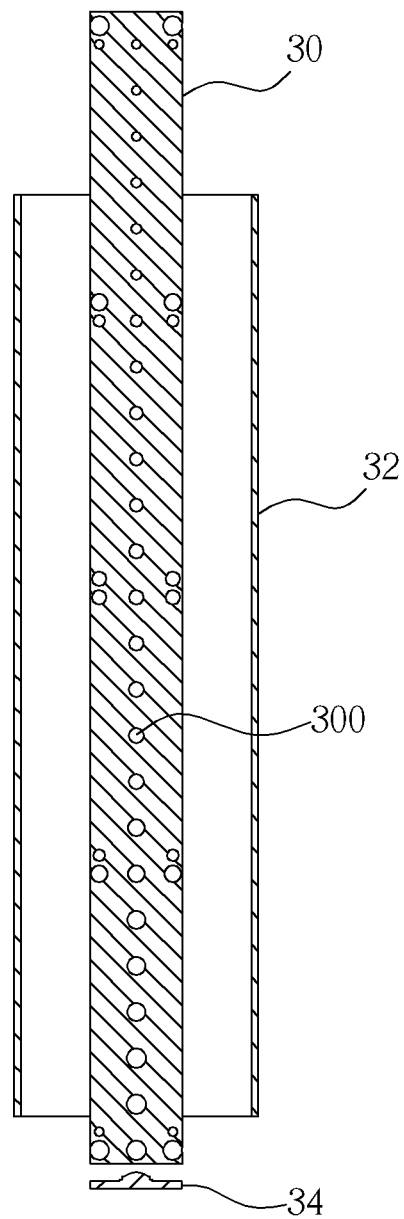
FIG. 5 is a cross-sectional view illustrating the light guiding core, the optical film and the light emitting module alone line X-X shown in FIG. 4.

Referring to FIGS. 2 to 5, FIG. 2 is a perspective view illustrating an illumination device 3 according to an embodiment of the invention, FIG. 3 is a top view illustrating the light guiding core 30 and the optical film 32 shown in FIG. 2, FIG. 4 is a side view illustrating the light guiding core 30, the optical film 32 and the light emitting module 34 shown in FIG. 2, and FIG. 5 is a cross-sectional view illustrating the light guiding core 30, the optical film 32 and the light emitting module 34 alone line X-X shown in FIG. 4. As shown in FIG. 2, the illumination device 3 comprises a light guiding core 30, an optical film 32, a light emitting module 34, a heat dissipating base 36 and a lamp socket 38. The light guiding core 30 may be made of polymethylmethacrylate (PMMA), polycarbonate (PC) or the like. The optical film 32 may be made of PC, PMMA, brightness enhancement film (BEF) or the like. The light emitting module 34 may be a monochromatic light emitting diode (LED) or, alternatively, the light emitting module 34 may comprise a plurality of LEDs and light colors emitted by the LEDs are different from each other (e.g. the light emitting module 34 may consist of red, green and blue LEDs).

The optical film 32 separately surrounds the light guiding core 30. The light emitting module 34 is disposed in the heat dissipating base 36 and located at one side of the light guiding core 30. The heat dissipating base 36 is used for dissipating heat generated by the light emitting module 34 when it works. The lamp socket 36 is fixed on a bottom of the heat dissipating base 36. The illumination device 3 can be installed on a lamp holder (not shown) by the lamp socket 38. In practical applications, there are electric wires and driving circuit board disposed in the lamp socket 38 and used for transmitting electricity provided by the lamp holder to the light emitting module 34, so as to enable the light emitting module 34 to emit light. Light emitted by the light emitting module 34 enters the light guiding core 30 and then is projected out of a periphery of the light guiding core 30 toward the optical film 32. In this embodiment, the optical film 32 is a half-transparent and half-reflection film, i.e. parts of light can pass through the optical film 32 and parts of light can be reflected by the optical film 32. Furthermore, since the optical film 32 separately surrounds the light guiding core 30, the optical film 32 can function as a lens. Accordingly, the light reflected by the optical film 32 will form an enlarged virtual image between the optical film 32 and the light guiding core 30 so as to form illusional and enlarged illumination effect. Therefore, the illumination device 3 has illumination function and pleasing appearance.

When a ratio of a diameter D1 of the optical film 32 to a diameter D2 of the light guiding core 30 is between 2 and 3 (i.e. $2 \leq D1/D2 \leq 3$), the illumination device 3 of the invention can obtain optimal imaging effect by experiment. Preferably, when a focal length of the optical film 32 is twice as large as a distance d between the light guiding core 30 and the optical film 32, a space, which is between the light guiding core 30 and the optical film 32, will be fully filled with the virtual image. Moreover, when a haze value of the optical film 32 is smaller than 20% and a reflectivity of the optical film 32 is between 10% and 50%, the imaging effect can be further improved.

As shown in FIG. 5, the light guiding core 30 has a plurality of scattering mediums 300 therein for scattering light out of the light guiding core 30 toward different directions. The scattering mediums 300 may be bubbles generated in the light guiding core 30 during forming process or particles embedded in the light guiding core 30 and it depends on practical applications.

Compared to the prior art, the optical film of the invention separately surrounds the light guiding core such that light projected out of the light guiding core is reflected by the optical film so as to form illusional and enlarged illumination effect. Furthermore, the optical film, which separately surrounds the light guiding core, can prevent the light guiding core from being scraped. When the ratio of the diameter of the optical film to the diameter of the light guiding core is between 2 and 3, the illumination device of the invention can obtain optimal imaging effect by experiment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illumination device comprising:
   a light guiding core;
   an optical film separately surrounding the light guiding core, a ratio of a diameter of the optical film to a diameter of the light guiding core being between 2 and 3; and
   a light emitting module disposed at one side of the light guiding core.

2. The illumination device of claim 1, wherein a haze value of the optical film is smaller than 20%.

3. The illumination device of claim 1, wherein a reflectivity of the optical film is between 10% and 50%.

4. The illumination device of claim 1, wherein a focal length of the optical film is twice as large as a distance between the light guiding core and the optical film.

5. The illumination device of claim 1, wherein a material of the optical film is one selected from a group consisting of polycarbonate, polymethylmethacrylate and brightness enhancement film.

6. The illumination device of claim 1, wherein the light emitting module is a light emitting diode.

7. The illumination device of claim 1, wherein the light emitting module comprises a plurality of light emitting diodes and light colors emitted by the light emitting diodes are different from each other.

8. The illumination device of claim 1, wherein the light guiding core has a plurality of scattering mediums therein.

9. The illumination device of claim 8, wherein the scattering mediums are bubbles.

\* \* \* \* \*